No. 612,840. Patented Oct. 25, 1898.
W. GLEASON.
GEAR TOOTH.
(Application filed Mar. 12, 1898.)
(No Model.)
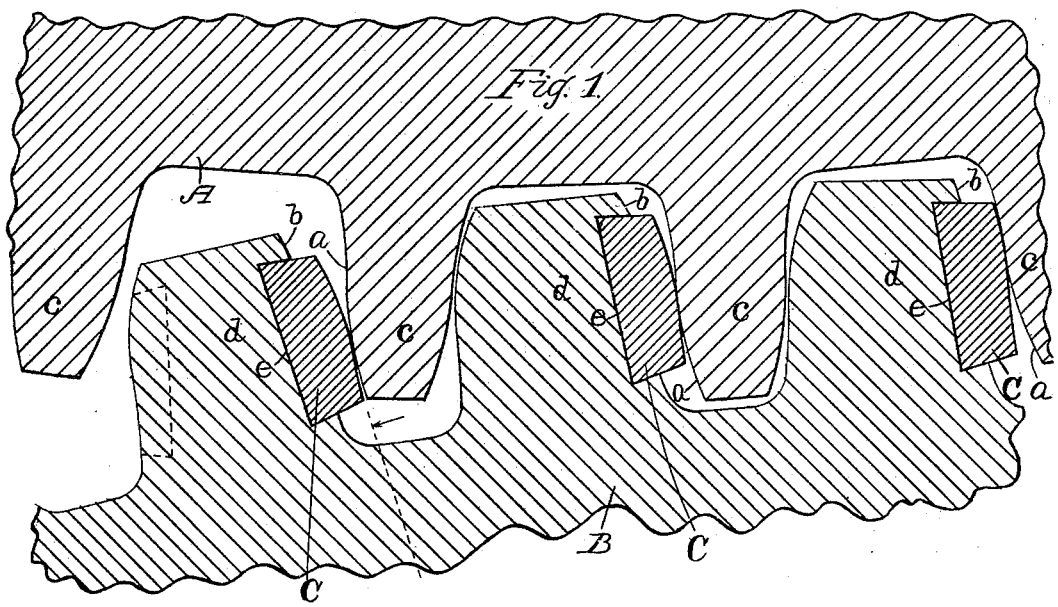
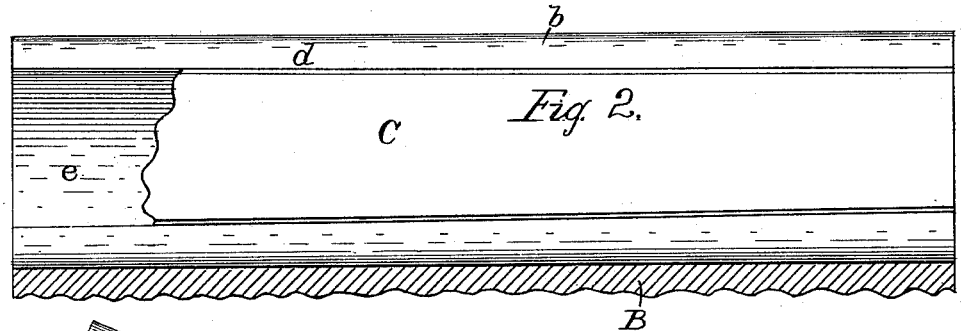
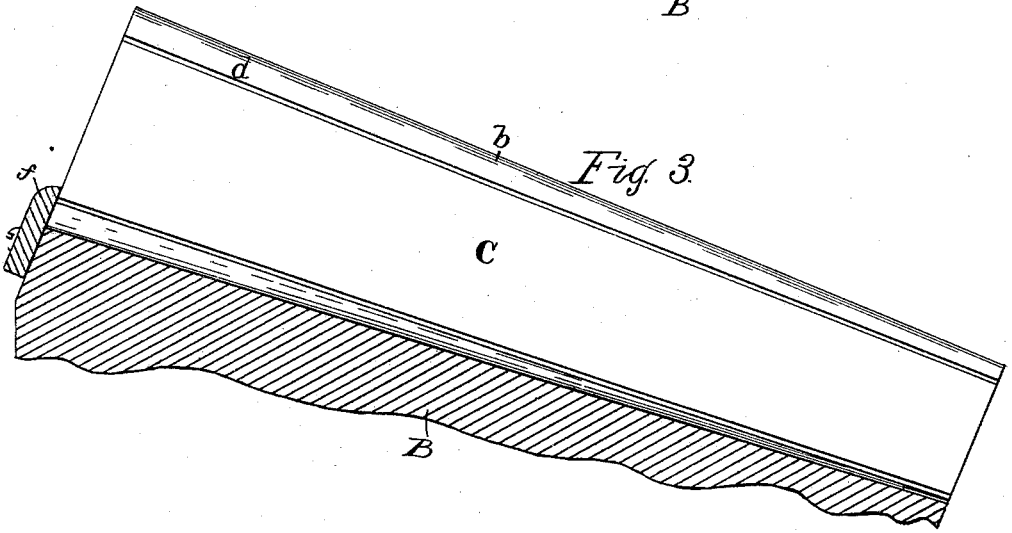
Attest:
M. L. Winston.
A. H. Wilbur.
Inventor:
W. Gleason,
By E. B. Whitmore, Atty.
THE NORRIS PETERS CO., PHOTO-LITHO., WASHINGTON, D. C.

UNITED STATES PATENT OFFICE.

WILLIAM GLEASON, OF ROCHESTER, NEW YORK.

GEAR-TOOTH.

SPECIFICATION forming part of Letters Patent No. 612,840, dated October 25, 1898.

Application filed March 12, 1898. Serial No. 673,660. (No model.)

*To all whom it may concern:*

Be it known that I, WILLIAM GLEASON, a citizen of the United States, residing at Rochester, in the county of Monroe and State of New York, have invented a new and useful Improvement in Gear-Teeth, which improvement is fully set forth in the following specification and shown in the accompanying drawings.

In using heavy iron gearing, more particularly if run at high velocities, there is liable to occur objectionable noise and disagreeable rumbling and jarring, resulting from the concussion of the teeth striking against each other. Heretofore it has been proposed to overcome this objection by placing a block of metal or wood in a groove in the tooth of the gear; but the tooth was not made thicker to counteract the weakening of the tooth caused by the formation of the groove, neither were there any means provided for preventing endwise displacement of the block when the gear was employed on a vertical shaft or in other positions where the block might drop out by gravity. In my invention I guard against these contingencies.

The invention is hereinafter fully described, and more particularly pointed out in the claims.

Referring to the drawings, Figure 1 is a cross-section of the adjacent teeth of a pair of coacting gears. Fig. 2 is an elevation of the working face of a spur-tooth, seen as indicated by arrow in Fig. 1, a part being broken away. Fig. 3 is a similar elevation of a tooth of a bevel-gear.

Referring to the drawings, A and B are a pair of iron-toothed gears, which may be either spur or bevel, $c$ and $d$ respectively being the teeth of each.

$a$ are the working faces of the teeth $c$, and $b$ the working faces of the teeth $d$. In the working faces of the teeth of one gear, as B, I form grooves or cavities $e$, in which are inserted bars or strips C, of some material different from that of which the teeth are made—as, for example, vulcanized india-rubber or paper, rawhide, Babbitt metal, or other substance, as may be desired. These bars or bodies are made to project from the faces of the teeth, as shown, to receive the blows and pressure of the opposing cogs $c$ not provided with said strips. The form of the cavities $e$ is not essential to my invention, it being my intention to employ such form as is best adapted for the purpose.

In practice I preferably plane or mill in the faces of the teeth continuous grooves slightly tapered, so the bars C may be driven in solidly to place. These grooves are undercut or made slightly dovetailed in cross-section, as shown, to better hold the bars. The latter may hold to place from friction, or cement or other adhesive substance may be employed or other simple mechanical means, as may be thought best. The working faces of the bars or their surfaces which meet the opposing teeth $c$ of the companion gear are given the proper form or transverse curvature for faces of gear-teeth, these surfaces of the bars when secured to the teeth being the real working faces of the teeth. In applying these separate bars to the teeth of a gear they are usually inserted in the teeth so as to extend about equally each way from the pitch-circle of the gear, the bars likewise reaching both above and below the surfaces of the teeth.

The teeth $d$, which receive the bars, are made thicker than the opposing teeth $c$, so as not to be rendered weak on account of the forming of the grooves in them. Usually the bars are supplied to but one face of each tooth, though in case a pair of gears are calculated to work at times in either direction the teeth of one gear are supplied with the bars on both faces.

The amount of taper given the bars C is a matter of convenience or of judgment on the part of the manufacturer of the gears. In the case of spur-teeth the taper may be very slight, just sufficient to insure a good driving fit for the bar. In the case of teeth of bevel-gears the taper may of necessity have to be a little greater. These concussion-bars may be applied to the teeth of either the driving or the driven gear of a pair. Usually when the gears of a pair differ in size the bars are supplied to the teeth of the smaller gear. The bars, being of a softer or more yielding material and less sonorous than the iron teeth to which they are supplied, very much deaden the noise that would otherwise occur and prevent the jarring that usually results from iron teeth working directly against each other, which is a rapid succession of heavy blows.

In case a bevel-gear on a vertical shaft is provided with these concussion-bars, which might be liable to drop out of place on account of gravity, I provide holding-pieces $f$, Fig. 3, secured to the gear in position to bear against the ends of the bars, or instead of a separate holding-piece for each bar a continuous ring of metal may be employed bearing against all the bars.

It is deemed important that the bar covers and is in contact with no part of the original face of the gear-tooth, but that it cover the central portion of the face of the tooth, leaving strips of said face exposed on either side, the bar standing out or projecting away from the face of the tooth to receive the thrust or pressure of a coacting tooth of the companion gear. By this construction better results are attained and the life of the gear is materially lengthened.

What I claim as my invention is—

1. The combination with a gear having a tooth provided upon its face with a groove dovetailed in cross-section and tapered longitudinally, of a separate bar or body of material different from that of the tooth and tapered with its sides beveled to fit the beveled walls of the dovetail groove and held therein with the same out of contact with the face of the tooth, all substantially as shown and described.

2. The combination with a gear having its teeth provided upon their faces with dovetail grooves tapered longitudinally, of a separate bar or body of material different from the body of the tooth tapered longitudinally and dovetail in cross-section held in each groove each bar being out of contact with the acting face of the tooth, and a plate secured to the side of the gear and overlapping the joint between the tooth and the bar and bearing against the larger end of the bar to prevent endwise displacement thereof, substantially as shown and described.

In witness whereof I have hereunto set my hand, this 8th day of March, 1898, in the presence of two subscribing witnesses.

WILLIAM GLEASON.

Witnesses:
E. B. WHITMORE,
M. L. WINSTON.